United States Patent
Nakasugi et al.

(10) Patent No.: US 9,528,427 B2
(45) Date of Patent: Dec. 27, 2016

(54) INTAKE SYSTEM FOR ENGINE

(71) Applicant: Mazda Motor Corporation, Aki-gun, Hiroshima (JP)

(72) Inventors: Tatsuro Nakasugi, Hiroshima (JP); Fusatoshi Tanaka, Higashihiroshima (JP); Takao Kadoishi, Hiroshima (JP); Nozomu Hachiya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 91 days.

(21) Appl. No.: 14/562,516

(22) Filed: Dec. 5, 2014

(65) Prior Publication Data
US 2015/0184581 A1 Jul. 2, 2015

(30) Foreign Application Priority Data
Dec. 26, 2013 (JP) ................. 2013-269467

(51) Int. Cl.
*F02B 33/00* (2006.01)
*F02B 29/04* (2006.01)
(Continued)

(52) U.S. Cl.
CPC .... *F02B 29/0468* (2013.01); *F02M 35/10268* (2013.01); *F02M 25/06* (2013.01);
(Continued)

(58) Field of Classification Search
CPC ............... F02B 29/0468; F02M 35/10268; F02M 25/06; Y02T 10/146
(Continued)

(56) References Cited

U.S. PATENT DOCUMENTS

| 3,250,263 A | * | 5/1966 | Gerjets | ................. F01M 13/04 123/573 |
| 5,072,698 A | * | 12/1991 | Fujihira | .............. F02B 29/0456 123/563 |

(Continued)

FOREIGN PATENT DOCUMENTS

| DE | | 3011111 A1 | * | 10/1981 | ............ F24D 11/005 |
| DE | EP 1785609 A1 | * | 5/2007 | .......... F02B 29/0462 |

(Continued)

*Primary Examiner* — Thai Ba Trieu
(74) *Attorney, Agent, or Firm* — Alleman Hall McCoy Russell & Tuttle LLP

(57) ABSTRACT

An intake system for an engine is provided. The system includes a chamber room formed in an intermediate section of an intake passage, an intercooler disposed inside the chamber room, an intake air inlet chamber formed in a part of the chamber room upstream of the intercooler, an introducing portion for introducing intake air into the intake air inlet chamber, and a baffle plate dividing the intake air inlet chamber into an upstream space communicating with the introducing portion and a downstream space communicating to the introducing portion via the upstream space. When the engine is in a low engine load operation, the intake air mainly flows through the upstream space to an intercooler side via the baffle plate, and when the engine is in a high engine load operation, the intake air flows through the upstream and downstream spaces to the intercooler side via the baffle plate.

11 Claims, 14 Drawing Sheets

(51) Int. Cl.
    *F02M 35/10*     (2006.01)
    *F02M 25/06*     (2016.01)

(52) U.S. Cl.
    CPC ............. *F02M 26/05* (2016.02); *F02M 26/06* (2016.02); *Y02T 10/146* (2013.01)

(58) Field of Classification Search
    USPC .......................................... 123/563; 60/599
    IPC ..................................................... F02B 29/04
    See application file for complete search history.

(56) References Cited

U.S. PATENT DOCUMENTS

| | | | | |
|---|---|---|---|---|
| 5,809,981 | A | * | 9/1998 | Berg-Sonne ........ F02B 29/0468 123/563 |
| 6,824,436 | B2 | * | 11/2004 | Matsuda .......... F02M 35/10013 123/572 |
| 8,955,501 | B2 | * | 2/2015 | Tanikawa ............. F01M 13/023 123/574 |
| 2007/0175612 | A1 | | 8/2007 | Hendrix |
| 2010/0083941 | A1 | | 4/2010 | Kardos |
| 2010/0300647 | A1 | | 12/2010 | Steurer et al. |
| 2011/0203559 | A1 | * | 8/2011 | Tanikawa ............. F01M 13/023 123/572 |
| 2013/0247859 | A1 | * | 9/2013 | Cremer ............ F02M 35/10091 123/184.21 |
| 2013/0263797 | A1 | * | 10/2013 | Sugiura ............ F02M 35/10268 123/41.01 |
| 2014/0150756 | A1 | * | 6/2014 | Smith ................. F02B 29/0493 123/563 |
| 2014/0158096 | A1 | * | 6/2014 | Leone ................. F02B 29/0468 123/563 |

FOREIGN PATENT DOCUMENTS

| | | | | |
|---|---|---|---|---|
| FR | 2645209 | A1 | * 10/1990 | .......... F02B 29/0462 |
| JP | 59190425 | A | * 10/1984 | |
| JP | 2011185147 | A | 9/2011 | |
| JP | 2013170564 | A | 9/2013 | |
| JP | WO 2015046182 | A1 | * 4/2015 | .......... F02B 29/0468 |
| WO | 2014003880 | A1 | 1/2014 | |

* cited by examiner

INTAKE SYSTEM FOR ENGINE

BACKGROUND

The present invention relates to an intake system for an engine, and particularly to an intake system for an engine in which an intercooler is disposed in a chamber room provided in an intermediate section of an intake passage.

Conventionally, to increase outputs of engines, turbochargers for operating a turbine by a thermal energy of exhaust gas, and turbocharging intake air to be supplied into combustion chambers by a compressor cooperating with the turbine, have been practically used. With such a turbocharger, since the temperature of compressed intake air increases to, for example, 80° C. to 120° C., when the high-temperature intake air is supplied into the combustion chambers as it is, a substantial intake-air filling efficiency does not increase as expected due to a decrease of a density of the intake air. Therefore, the intake air of which temperature increases before being supplied into the combustion chambers is cooled by the intercooler.

JP2011-185147A discloses an intake system for an engine, in which an intake manifold as an intake air distributing tube provided in an intermediate section of an intake passage includes a surge tank and a plurality of intake branches for leading intake air into respective cylinders of the engine, and a water-cooled intercooler is accommodated inside the surge tank.

With the intake system installed with the intercooler, when a throttle opening is small, a flow speed of the intake air passing through the intercooler is slow. Therefore, a period of time for the intake air to pass through the intercooler becomes long, and moisture, such as water vapor contained within the intake air, exchanges heat with the intercooler (fins). Thus, the moisture is condensed and becomes water drops, and the water drops attach to the fins of the intercooler. As a result, when the throttle opening is increased rapidly, a large amount of such condensed water attached to the fins is sucked into the combustion chambers and misfire of the engine may occur.

JP2013-170564A discloses an intake system for an engine, which includes an intercooler for cooling intake air flowing in an intake passage, and a regulator for regulating, when a flow rate of the intake air flowing in the intake passage is low, the flow of the intake air by reducing a passage cross-sectional area of the intercooler compared to when the intake flow rate is high. The regulator includes a first partitioning wall partitioning a section of the intake passage upstream of the intercooler into a first flow path and a second flow path, and a closing part having an interlocking mechanism for operating a valve member which opens and closes the first flow path, in cooperation with operation of a throttle controller.

With the intake system of the engine of JP2013-170564A, since the flow speed of the intake air does not decrease when the throttle opening is small, the time period for the intake air to pass through the intercooler is short. Therefore, the moisture within the intake air is difficult to condense on the fins of the intercooler, and the amount of the condensed water sucked into the combustion chambers when the throttle opening is increased rapidly can be reduced.

However, the intake system of the engine of JP2013-170564A requires the installation of the interlocking mechanism for interlocking the throttle with the regulator, the adjustment between an opening position of the throttle and an installing position of the regulator, and the like, which may cause complication in the system structure and restriction in an arranging layout. Therefore, it is difficult to say that this intake system is sufficiently practical.

SUMMARY

The present invention is made in view of the above situations and provides an intake system for an engine, which achieves both suppressing generation of condensed water in a low engine load operation and securing an engine output in a high engine load operation, while achieving a simplified structure of itself.

According to an aspect of the present invention, an intake system for an engine is provided. The intake system includes a chamber room formed in an intermediate section of an intake passage, and an intercooler disposed inside the chamber room. The intake system includes an intake air inlet chamber formed in a part of the chamber room upstream of the intercooler, an introducing portion for introducing intake air into the intake air inlet chamber, and a baffle plate dividing the intake air inlet chamber into an upstream space communicating with the introducing portion and a downstream space communicating with the introducing portion via the upstream space. When the engine is in a low engine load operation, the intake air mainly flows through the upstream space to an intercooler side via the baffle plate, and when the engine is in a high engine load operation, the intake air flows through the upstream and downstream spaces to the intercooler side via the baffle plate.

According to the intake system of the engine, by providing the baffle plate dividing the upstream and downstream spaces, the intake air inlet chamber between the introducing portion and the intercooler can be formed as the intake passage where the upstream and downstream spaces are consecutive in a single stream, and thus, the intake system can flow the intake air introduced from the introducing portion by the distance corresponding to the introducing amount, from the upstream space to the downstream space.

In the low engine load operation in which the intake air introducing amount is small, the intake air mainly flows to the upstream space and no further, and thus, the intake air flows to the intercooler side only from the region where the intake air flows. In the high engine load operation in which the intake air introducing amount is large, the intake air flows to the downstream space through the upstream space, and thus, the intake air flows to the intercooler side from a larger region than in the low engine load operation.

Thus, without requiring various interlocking mechanisms, particular arrangement adjustment or the like, the passage area where the intake air flows through to enter the intercooler can be adjusted to a passage area corresponding to the engine load by utilizing an associated property between the intake air introducing amount and the flowing distance, and the flow speed of the intake air flowing through the intercooler can be adjusted.

The baffle plate may divide the intake air inlet chamber into an upper section and a lower section. Thus, a long intake flow path can be formed by the baffle plate with the simple structure divided into the upper and lower sections, and a passage area of the intake air into the intercooler can be adjusted to a passage area corresponding to the engine load with higher accuracy.

A communication path may be provided to communicate, in a flow direction of the intake air, a downstream end section of the upstream space with an upstream end section of the downstream space. Thus, in the high engine load operation, the intake air can shift smoothly from the downstream end section of the upstream space to the upstream end section of the downstream space in the flow direction of the intake air. Therefore, the adjustment of the passage area corresponding to the engine load can be performed suitably with the simple structure.

The baffle plate may be integrally formed with a wall of the chamber room. Thus, the baffle plate and the intake air inlet chamber can be formed in a single process, and the baffle plate can be formed easily.

The introducing portion may be formed in a vertical wall of the upstream space, the vertical wall being in parallel to the flow direction of the intake air flowing inside the intercooler. Thus, in the low engine load operation, the flow passage through which the intake air flows can be shortened as much as possible, and therefore, the responsiveness of the intake air supply to the operation of a throttle can be improved.

The upstream space may be disposed on the upper side of the downstream space. The system may also include a suction mechanism for sucking out liquid drops retained in the downstream space, to the outside of the chamber room. The baffle plate may cover, from above, the downstream space while leaving the communication path uncovered.

Thus, exertion of a remained liquid drop catching effect of the intake air can be prevented by the baffle plate, and as a result, the movement of the remained liquid drop to separate from a suction port of the suction mechanism can be suppressed and, regardless of the engine load, the sucking-out function of the suction mechanism can be secured.

According to another aspect of the present invention, an intake system for an engine is provided. The intake system includes a chamber room formed in an intermediate section of an intake passage, and an intercooler disposed inside the chamber room. The intake system includes an intake air inlet chamber formed in a part of the chamber room upstream of the intercooler, a suction mechanism for sucking out liquid drops retained in the intake air inlet chamber, to outside of the chamber room, and a baffle plate covering the liquid drops from above to limit influence of the intake air on the liquid drops retained in the intake air inlet chamber, the influence depending on a flow speed of the intake air.

Thus, exertion of a remained liquid drop catching effect of intake air can be prevented by the baffle plate, and as a result, the movement of the remained liquid drop to separate from a suction port of the suction mechanism can be suppressed and, regardless of an engine load, the sucking-out function of the suction mechanism can be secured.

The baffle plate may divide the intake air inlet chamber into an upper section and a lower section. Thus, a long intake flow path can be formed by the baffle plate with the simple structure divided into the upper and lower sections, and a passage area of the intake air into the intercooler can be adjusted to a passage area corresponding to the engine load with higher accuracy.

The baffle plate may be integrally formed with a wall of the chamber room. Thus, the baffle plate and the intake air inlet chamber can be formed in a single process, and the baffle plate can be formed easily.

A suction port of the suction mechanism may be formed to face a lowest part of a bottom wall of the chamber room.

The intake system may also include an introducing portion for introducing the intake air into the intake air inlet chamber. The baffle plate may divide the intake air inlet chamber into an upstream space communicating with the introducing portion and a downstream space communicating to the introducing portion via the upstream space. When the engine is in a low engine load operation, the intake air mainly may flow through the upstream space to the intercooler side via the baffle plate, and when the engine is in a high engine load operation, the intake air may flow through the upstream and downstream spaces to the intercooler side via the baffle plate.

According to the intake system of the engine, by providing the baffle plate dividing the upstream and downstream spaces, the intake air inlet chamber between the introducing portion and the intercooler can be formed as the intake passage where the upstream and downstream spaces are consecutive in a single stream, and thus, the intake system can flow the intake air introduced from the introducing portion by the distance corresponding to the introducing amount, from the upstream space to the downstream space.

In the low engine load operation in which the intake air introducing amount is small, the intake air mainly flows to the upstream space and no further, and thus, the intake air flows to the intercooler side only from the region where the intake air flows. In the high engine load operation in which the intake air introducing amount is large, the intake air flows to the downstream space through the upstream space, and thus, the intake air flows to the intercooler side from a larger region than in the low engine load operation.

Thus, without requiring various interlocking mechanisms, particular arrangement adjustment or the like, the passage area where the intake air flows through to enter the intercooler can be adjusted to a passage area corresponding to the engine load by utilizing the associated property between the intake air introducing amount and the flowing distance, and the flow speed of the intake air flowing through the intercooler can be adjusted.

According to the intake system of the engine of the present invention, both suppressing the generation of the condensed water in the low engine load operation and securing the engine output in the high engine load operation can be achieved, while achieving simplified structure of the intake system.

DETAILED DESCRIPTION OF EMBODIMENT

Hereinafter, one embodiment of the present invention is described with respect to the appended drawings.

The following description of the preferred embodiment is essentially merely an illustration, and it is not intended to limit the scope, application and use of the present invention.

First, respective configurations provided to an engine 1 are schematically described.

Figure 1:
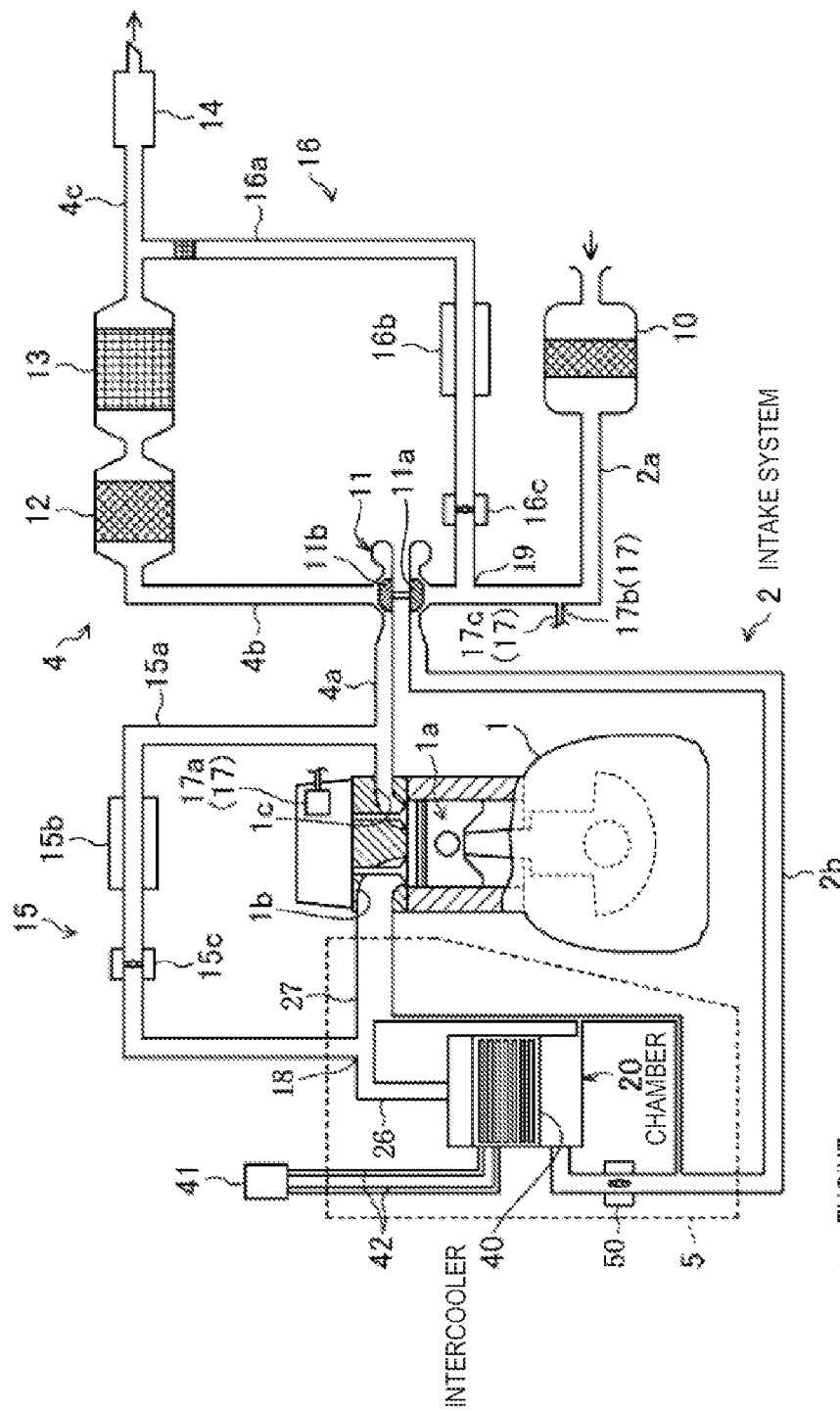
FIG. 1 is a schematic view illustrating an engine, and a configuration of an intake system and a configuration of an exhaust system provided to the engine according to one embodiment of the present invention.
Figure 2:
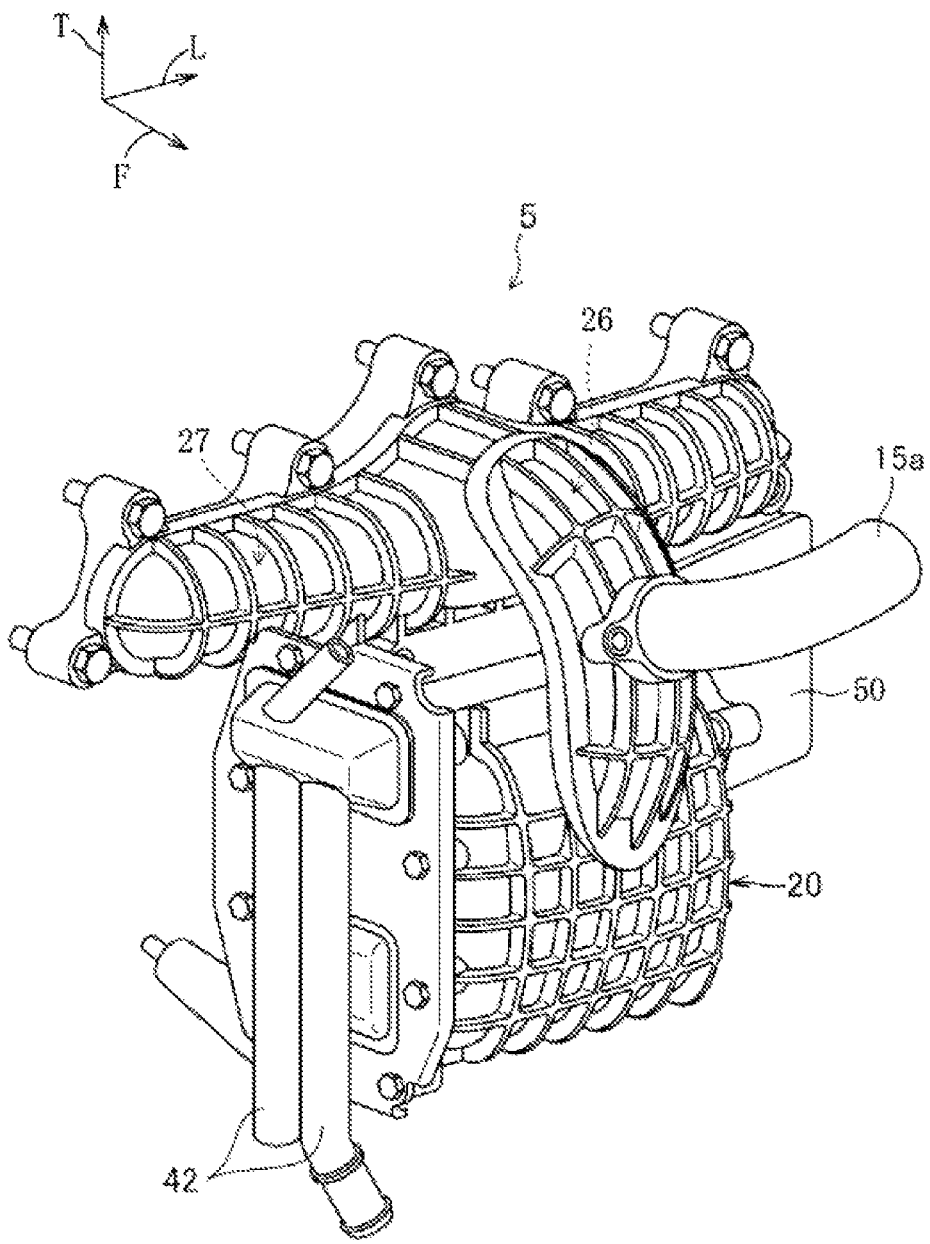
FIG. 2 is a schematic perspective view illustrating an exterior of an intake system body.

FIG. 1 is a schematic view illustrating an engine 1, and a configuration of an intake system 2 and a configuration of an exhaust system 4 provided to the engine 1 of this embodiment. The engine 1 is an inline four-cylinder diesel engine installed in an automobile, and four cylinders 1a for extracting power by combusting mixture gas containing fuel and intake air are arranged in line in the engine 1. Note that the illustration of a fuel supply system is omitted.

In the engine 1, two intake ports 1b and two exhaust ports 1c are formed for each cylinder 1a. Each intake port 1b is connected with the intake system 2, and intake air is introduced into each cylinder 1a through the intake system 2 and the intake ports 1b. Each exhaust port 1c is connected with the exhaust system 4, and exhaust gas generated in each cylinder 1a is led through the exhaust system 4 and the exhaust ports 1c, processed (e.g., purified), and then discharged to the atmosphere.

Next, an outline of the intake system 2 is described.

An air cleaner 10 is disposed in an upstream end section of an intake passage of the intake system 2. The air cleaner 10 removes dust from outdoor air and introduces the cleaned air (intake air) into the intake passage. A section of the intake passage downstream of the air cleaner 10 is connected to a turbocharger 11 via a first intake pipe 2a, and the intake air is turbocharged by a compressor 11a of the turbocharger 11.

Further, a section of the intake passage downstream of the turbocharger 11 is connected to an intake system body 5 via a second intake pipe 2b. Although it is described later in detail, a chamber room 20, an intercooler 40, a valve unit 50 and the like are unitized and provided to the intake system body 5.

The intercooler 40 is accommodated in the chamber room 20 and cools the intake air flowed into the chamber room 20. The intercooler 40 is a water-cooled type, and cooling water (coolant) is supplied from the water pump 41 into the intercooler 40 via a cooling pipe 42 while circulating.

A section of the intake passage downstream of the chamber room 20 (formed by a narrow intake passage 26 and a wide intake passage 27 described later) is directly coupled to the respective intake ports 1b of the engine 1. Therefore, intake air cooled by the intercooler 40, and homogenized and equalized in pressure inside the chamber room 20, is directly introduced into the cylinder 1a. The section of the intake passage upstream of the chamber room 20 (the first intake pipe 2a, the second intake pipe 2b, and a later-described coupling passage 51) forms an upstream intake passage, and the section downstream of the chamber room 20 forms a downstream intake passage, in terms of the intake air flow direction.

Next, an outline of the exhaust system 4 is described.

The exhaust system 4 is provided with a first exhaust pipe 4a coupled to the respective exhaust ports 1c, and the exhaust gas generated in the cylinder 1a is introduced into the first exhaust pipe 4a. The first exhaust pipe 4a is connected, on its downstream side, with the turbocharger 11. A turbine 11b for operating by using the exhaust gas is provided in the turbocharger 11, and the compressor 11a is operated by the turbine 11b.

An oxidative catalyst 12 for removing CO and HC within the exhaust gas and a DPF (Diesel Particulate Filter) 13 for removing particulate matters within the exhaust gas are disposed in a second exhaust pipe 4b connecting with the turbocharger 11 from the downstream side. A third exhaust pipe 4c connecting with the DPF 13 from the downstream side is connected with a silencer 14. An exit of the silencer 14 is opened to the atmosphere, and the exhaust gas introduced into the exhaust system 4 is discharged outside from the exit.

The intake system 2 and exhaust system 4 of the engine 1 of this embodiment are provided with a high-pressure EGR device 15, a low-pressure EGR device 16, and a blow-by gas recirculation device 17.

The high-pressure EGR device 15 introduces high-pressure EGR gas into the intake air. Before the exhaust gas is reduced in pressure and purified by passing through the turbocharger 11, the oxidative catalyst 12, and the DPF 13, the high-pressure EGR device 15 circulates the exhaust gas from a position of the exhaust passage upstream of the turbocharger 11 and the like, back to a downstream section of the intake passage where the pressure is high.

The high-pressure EGR device 15 includes a high-pressure EGR pipe 15a, a high-pressure EGR cooler 15b, and a high-pressure EGR valve 15c.

The high-pressure EGR pipe 15a is connected, at its upstream end, with the first exhaust pipe 4a and takes in a part of the exhaust gas (high-pressure EGR gas containing carbon) immediately after being led out from the cylinder 1a. A downstream end of the high-pressure EGR pipe 15a is connected with a first gas introduction port 18 formed at a position of the intake passage downstream of the intake system body 5. The high-pressure EGR cooler 15b cools the high-pressure EGR gas flowing inside the high-pressure EGR pipe 15a. The high-pressure EGR valve 15c adjusts a flow rate of the high-pressure EGR gas flowing inside the high-pressure EGR pipe 15a. The high-pressure EGR gas after the cooling and the flow rate adjustment, merges with the intake air through the first gas introduction port 18.

The low-pressure EGR device 16 introduces low-pressure EGR gas into the intake air. After the exhaust gas passes through the turbocharger 11, the oxidative catalyst 12, and the DPF 13 to be reduced in pressure and purified, the low-pressure EGR device 16 circulates the exhaust gas from a position of the exhaust passage downstream of the turbocharger 11 and the like, back to an upstream section of the intake passage where the pressure is low.

The low-pressure EGR device 16 includes a low-pressure EGR pipe 16a, a low-pressure EGR cooler 16b, and a low-pressure EGR valve 16c.

The low-pressure EGR pipe 16a is connected, at its upstream end, with the third exhaust pipe 4c and takes in a part of the exhaust gas (low-pressure EGR gas containing less carbon than the high-pressure EGR gas while containing a large amount of moisture) before being reduced in pressure, purified, and discharged outside. A downstream end of the low-pressure EGR pipe 16a is connected with a second gas introduction port 19 formed at a position of the first intake pipe 2a upstream of the turbocharger 11. The low-pressure EGR cooler 16b cools the low-pressure EGR gas flowing inside the low-pressure EGR pipe 16a. The low-pressure EGR valve 16c adjusts a flow rate of the low-pressure EGR gas flowing inside the low-pressure EGR pipe 16a. The low-pressure EGR gas after the cooling and the flow rate adjustment, merges with the intake air through the second gas introduction port 19.

The blow-by gas recirculation device 17 introduces blow-by gas into the intake air. The blow-by gas recirculation device 17 includes a blow-by gas inlet port 17a, a blow-by gas introduction port 17b, and a blow-by gas pipe 17c. The blow-by gas inlet port 17a of this embodiment is installed in a cylinder head of the engine 1 and takes in unburned mixture gas (blow-by gas containing moisture, oil, and carbon) flowing out from the cylinder 1a to its periphery when the engine 1 is started. The blow-by gas introduction port 17b is formed in the upstream low pressure section of the intake passage, specifically, the first intake pipe 2a. The blow-by gas pipe 17c is connected with the blow-by gas inlet port 17a and the blow-by gas introduction port 17b. The blow-by gas taken from the blow-by gas inlet port 17a merges with the intake air through the blow-by gas pipe 17c and the blow-by gas introduction port 17b.

Next, a specific configuration of the intake system body 5 is described.

As illustrated in FIGS. 2 to 9 and FIG. 11, the intake system body 5 includes the chamber room 20, the valve unit 50, and the intercooler 40. Note that, in the drawings, the arrow F indicates forward, the arrow L indicates leftward, the arrow T indicates upward, and the arrow B indicates downward.

The chamber room 20 is a resin molded component formed by coupling five parts, and as illustrated in FIGS. 5 to 9, a large-capacity internal space S enlarging the flow path of the intake air is formed inside the chamber room 20. An introducing portion 21 connecting with the intake passage is formed in a rear part of the chamber room 20, and the intake air flows into the chamber room 20 through the introducing portion 21. The internal space S of the chamber room 20 has a flow path cross-sectional area (an area of a cross section in a direction perpendicular to the flow of the intake air) larger than the introducing portion 21, and the intake air flowed into the chamber room 20 spreads within the internal space S, which stimulates the homogenization and the pressure equalization.

Figure 9:
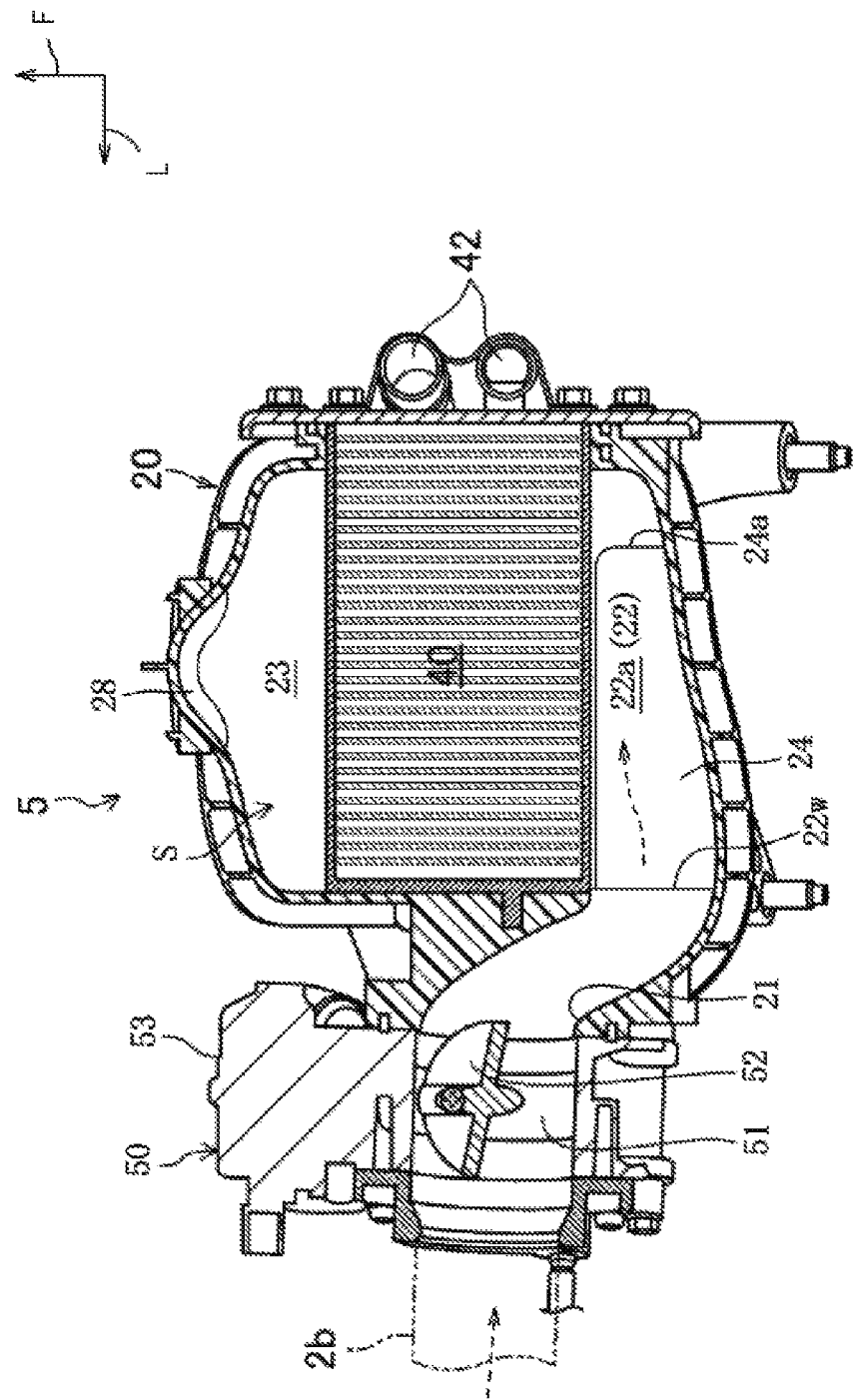
FIG. 9 is a cross-sectional view taken along a line IX-IX of FIG. 4.

As illustrated in FIG. 9, the valve unit 50 is provided adjacent to the introducing portion 21 and is connected with the second intake pipe 2b. The valve unit 50 includes the coupling passage 51 (forming the upstream intake passage) having a cylindrical shape and intervening between the introducing portion 21 and the second intake pipe 2b, a valve body 52 (throttle valve) which is a circular plate and supported to be rotatable inside the coupling passage 51, and a valve control unit 53 for controlling the rotation of the valve body 52. The valve unit 50 changes an opening of the intake passage by controlling the rotation of the valve body 52, so as to adjust an introducing amount of the intake air flowing into the chamber room 20.

The intercooler 40 is a cuboid structural body having therein a flow path where heat exchange is performed with the intake air, and the intercooler 40 is accommodated in the internal space S. The internal space S is divided by the intercooler 40, into an intake air inlet chamber 22 into which uncooled intake air flows, and an intake air outlet chamber 23 from which cooled intake air flows.

The intake air inlet chamber 22 is divided by a baffle plate 24, into an upstream space 22a where the intake air mainly flows through toward the intercooler 40 when the engine 1 is in a low engine load operation, and a downstream space 22b where the intake air flows toward the intercooler 40 in cooperation with the upstream space 22a when the engine 1 is in a high engine load operation.

Figure 7:
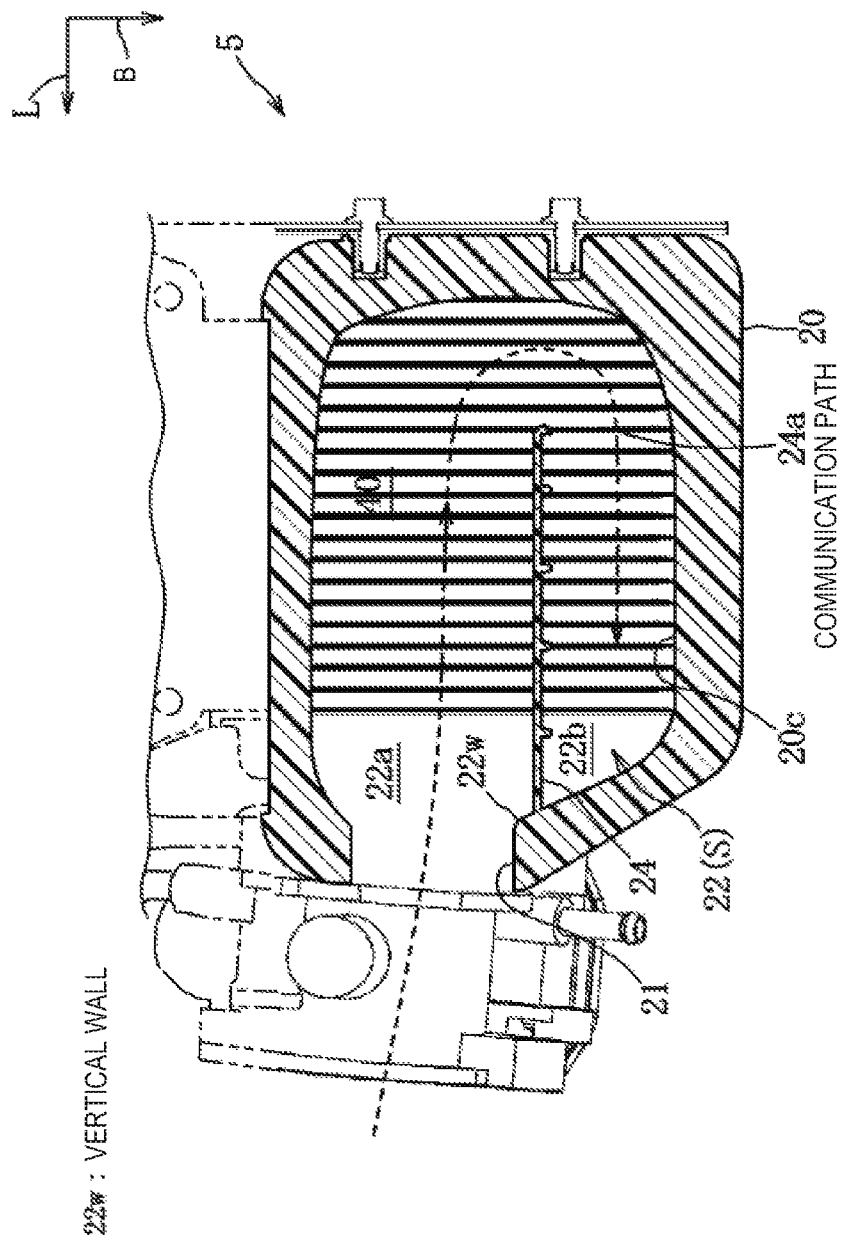
FIG. 7 is a cross-sectional view taken along a line VII-VII of FIG. 6.

As illustrated in FIGS. 7 and 9, the upstream space 22a is formed to be continuous to the introducing portion 21 formed in the rear part of the chamber 22. The introducing portion 21 is formed in a vertical wall 22w of the upstream space 22a, in parallel to a flow direction of the intake air inside the intercooler 40. As indicated by the broken lines in FIGS. 7 and 9, the intake air introduced from the introducing portion 21 flows rightward from the left within the upstream space 22a. A communication path 24a where the intake air flows through is formed in a rightward end section (an intake-air flow downstream end section) of the upstream space 22a.

Figure 5:
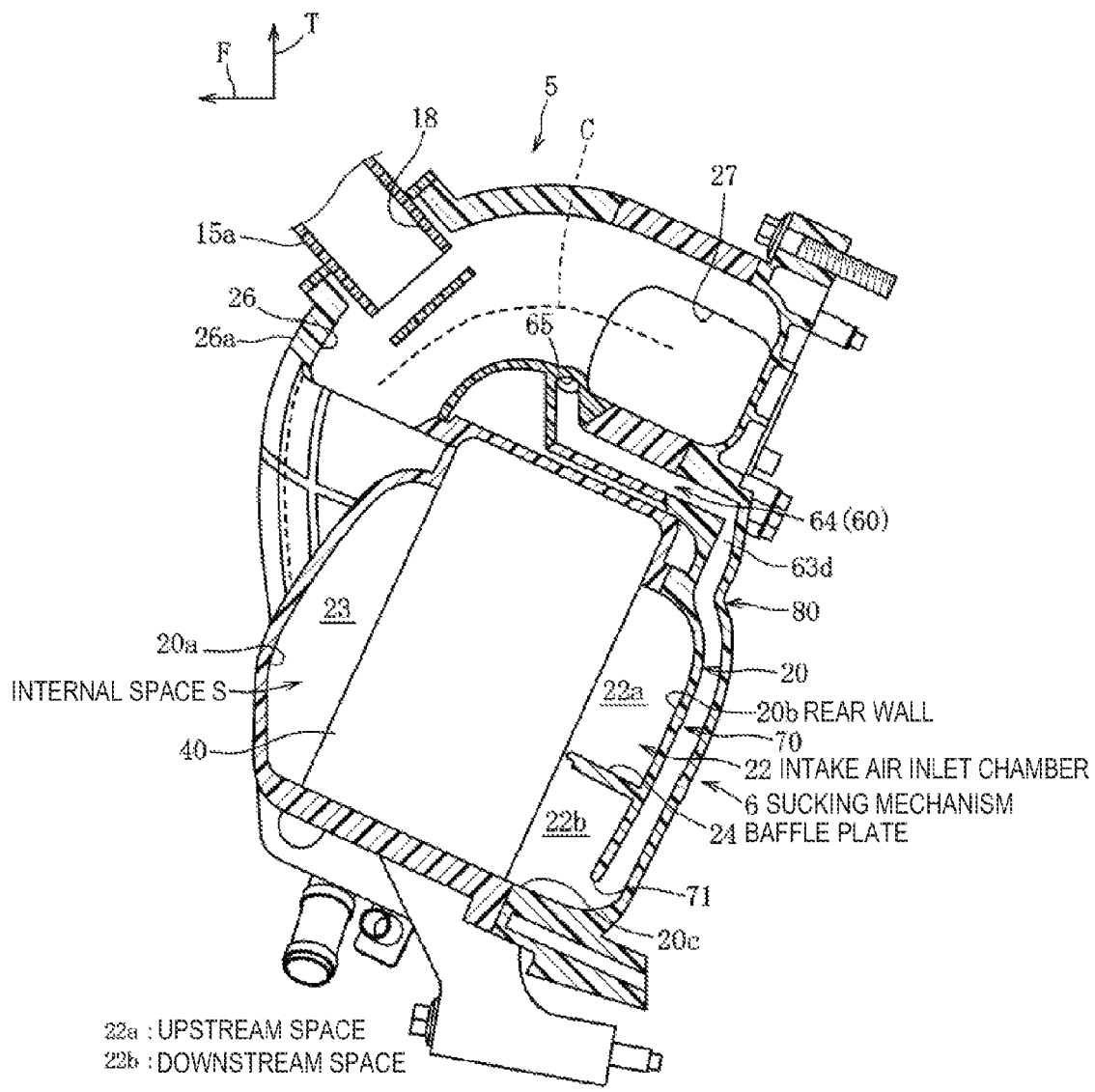
FIG. 5 is a cross-sectional view taken along a line V-V of FIG. 4.
Figure 6:
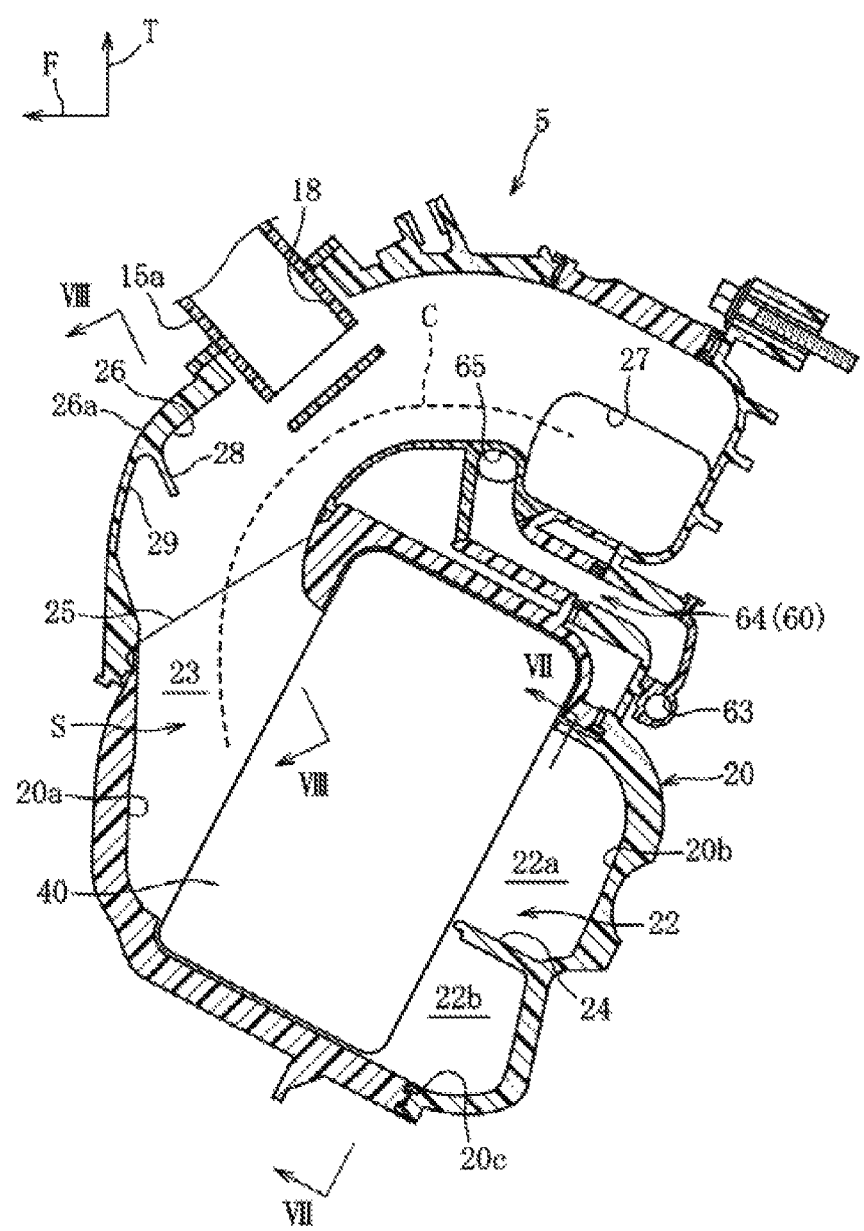
FIG. 6 is a cross-sectional view taken along a line VI-VI of FIG. 4.

As illustrated in FIGS. 5 to 7, the downstream space 22b is formed below the upstream space 22a with the baffle plate 24 extending in the left-and-right directions sandwiched therebetween. A rightward end section (an intake-air flow upstream end section) of the downstream space 22b communicates with the rightward end section of the upstream space 22a via the communication path 24a.

The baffle plate 24 is formed continuously from a left end of a rear wall 20b of the chamber room 20 to near a right end of the rear wall 20b, and extends forward from the rear wall 20b of the chamber room 20 to near a rear end of the intercooler 40. The baffle plate 24 is integrally formed with the rear wall 20b of the chamber room 20 by injection molding.

Thus, when the engine 1 is in the low engine load operation, the intake air introduced from the introducing portion 21 flows rightward and mainly reaches an intermediate section of the upstream space 22a in the left-and-right directions. When the engine 1 is in the high engine load operation, the intake air introduced from the introducing portion 21 flows rightward, passes through the communication path 24a from the rightward end section of the upstream space 22a and flows leftward in the downstream space 22b. In other words, an intake flow path formed by the upstream and downstream spaces 22a and 22b which are substantially consecutive in a single stream is formed between the introducing portion 21 and the intercooler 40. Thus, the intake air introduced from the introducing portion 21 within the intake air inlet chamber 22 flows a distance corresponding to the introducing amount, from the upstream space 22a to the downstream space 22b. Since the intake air flows through the intercooler 40 from a passage area of the intercooler 40 corresponding to the flowing distance, the flow speed of the intake air flowing through the intercooler 40 is changed according to the flowing distance of the intake air.

As illustrated in FIGS. 5 and 6, the intercooler 40 is provided inside the chamber room 20 in a state where the intercooler 40 inclines such that its lower end part on the rear side is positioned lower than its lower end part on the front side.

Accordingly, a lower end part of the intake air inlet chamber 22 is positioned lower than a lower end part of the intake air outlet chamber 23, and thus, the lower end part of the intake air inlet chamber 22, in other words, a rear end part of a bottom wall 20c of the chamber room 20 corresponds to the lowest section of the internal space S of the chamber room 20. Liquid drops of, for example, water and oil contained within the intake air and water condensed on the intercooler 40 and dropped (collectively referred to as remaining liquid) tend to accumulate in this lower end part of the chamber room 20 at the low position. Especially when the low-pressure EGR gas and the blow-by gas are mixed in the intake air, the remaining liquid is more likely to accumulate.

A connecting portion 25 opening to the intake air outlet chamber 23 is formed in a front upper part of the chamber room 20.

As illustrated in FIGS. 2, 3, 5, 6 and 8, the connecting portion 25 is connected with the narrow intake passage 26 extending upward while curving along the upper part of the chamber room 20 and for narrowing the passage area compared to the chamber room 20.

A front section of the narrow intake passage 26 forms a convex section 26a protruding forward from the chamber room 20.

A baffle plate 28 is integrally provided to an inner wall of the convex section 26a facing a front end part of the intercooler 40. A volume chamber 29 bulging radially outward with respect to a central axis C of the narrow intake passage 26 is formed on the upstream side of an end part of the baffle plate 28 on an opposite side to a side of the central axis C in the flow direction of the intake air. Note that a depth of the volume chamber 29 is set smaller than heights of ribs formed in an outer wall of the convex section 26a (see FIG. 8). The depth of the volume chamber 29 is defined in a direction perpendicular to the wall, and the height of each rib is defined in its extending direction from the wall.

Figure 8:
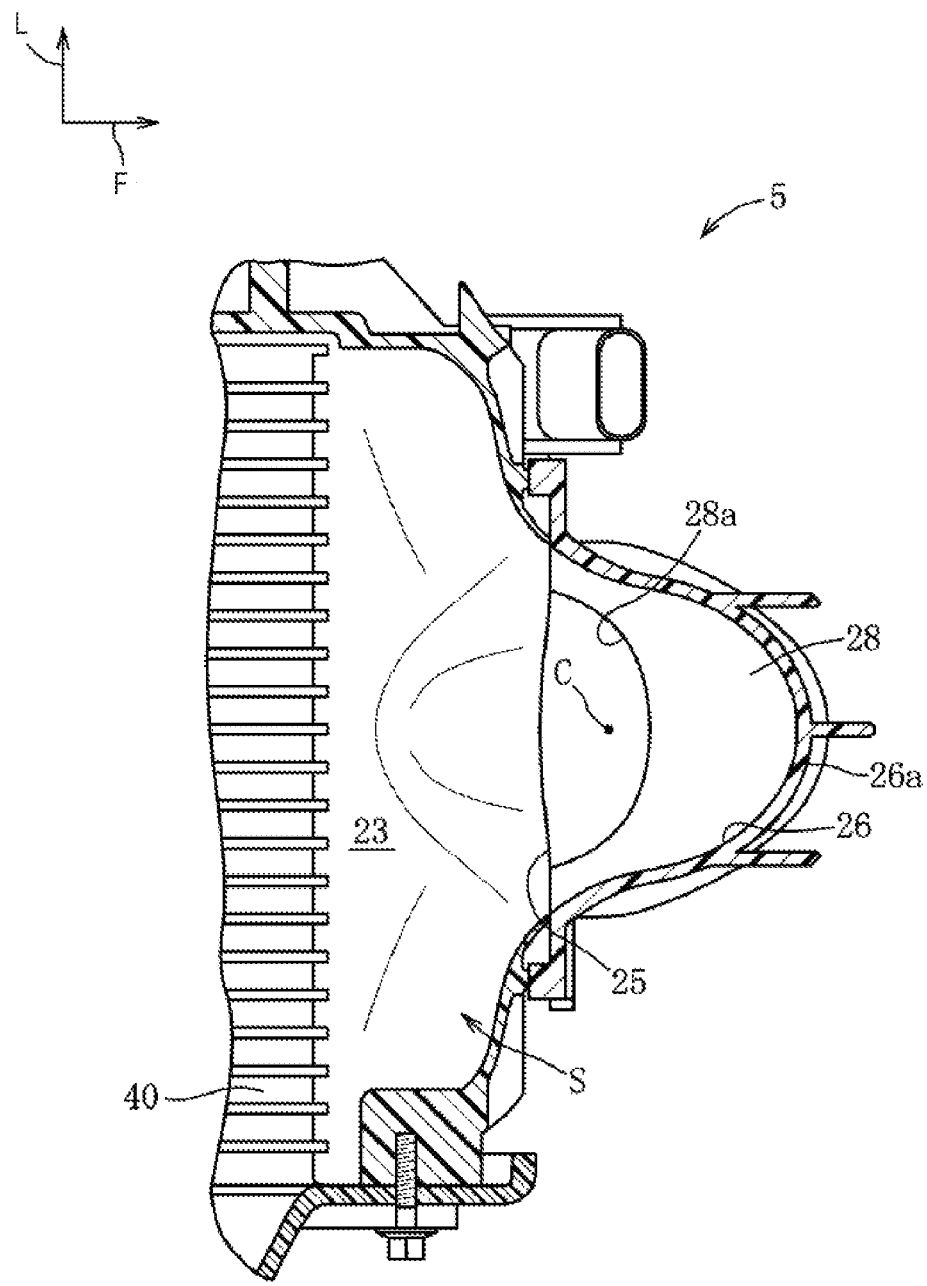
FIG. 8 is a cross-sectional view taken along a line VIII-VIII of FIG. 6.

As illustrated in FIGS. 6 and 8, the baffle plate 28 is provided at a position near the connecting portion 25 of the narrow intake passage 26 and the chamber room 20, so that the baffle plate 28 captures, from the condensed water generated by the intercooler 40 and the remaining liquid retained in the lower part of the chamber room 20, liquid drops caught by the intake air.

The baffle plate 28 is formed to incline downward so as to be separated from the central axis C of the narrow intake passage 26 more on the downstream side in the flow direction of the intake air. The baffle plate 28 is formed substantially in a crescent in its plan view, and a cutout portion 28a shaped in a substantially partial circle is formed in an end part of the baffle plate 28 on the side of the central axis C of the narrow intake passage 26.

Thus, the intake air mixed with the remaining liquid and the condensed water can be collected in the narrow intake passage 26, and the liquid drops contained within the intake air can be captured by the baffle plate 28 provided to the narrow intake passage 26. Therefore, the capturing amount of the liquid drops can be increased by the compact baffle plate 28 while minimizing intake resistance.

Furthermore, while the liquid drops flowing on the side radially outward (the side of the baffle plate 28) centering on the central axis C due to the inertia force are captured by the baffle plate 28 and the volume chamber 29, through the cutout portion 28a, a main flow of the intake air flowing on the side radially inward centering on the central axis C of the narrow intake passage 26 is allowed.

Figure 3:
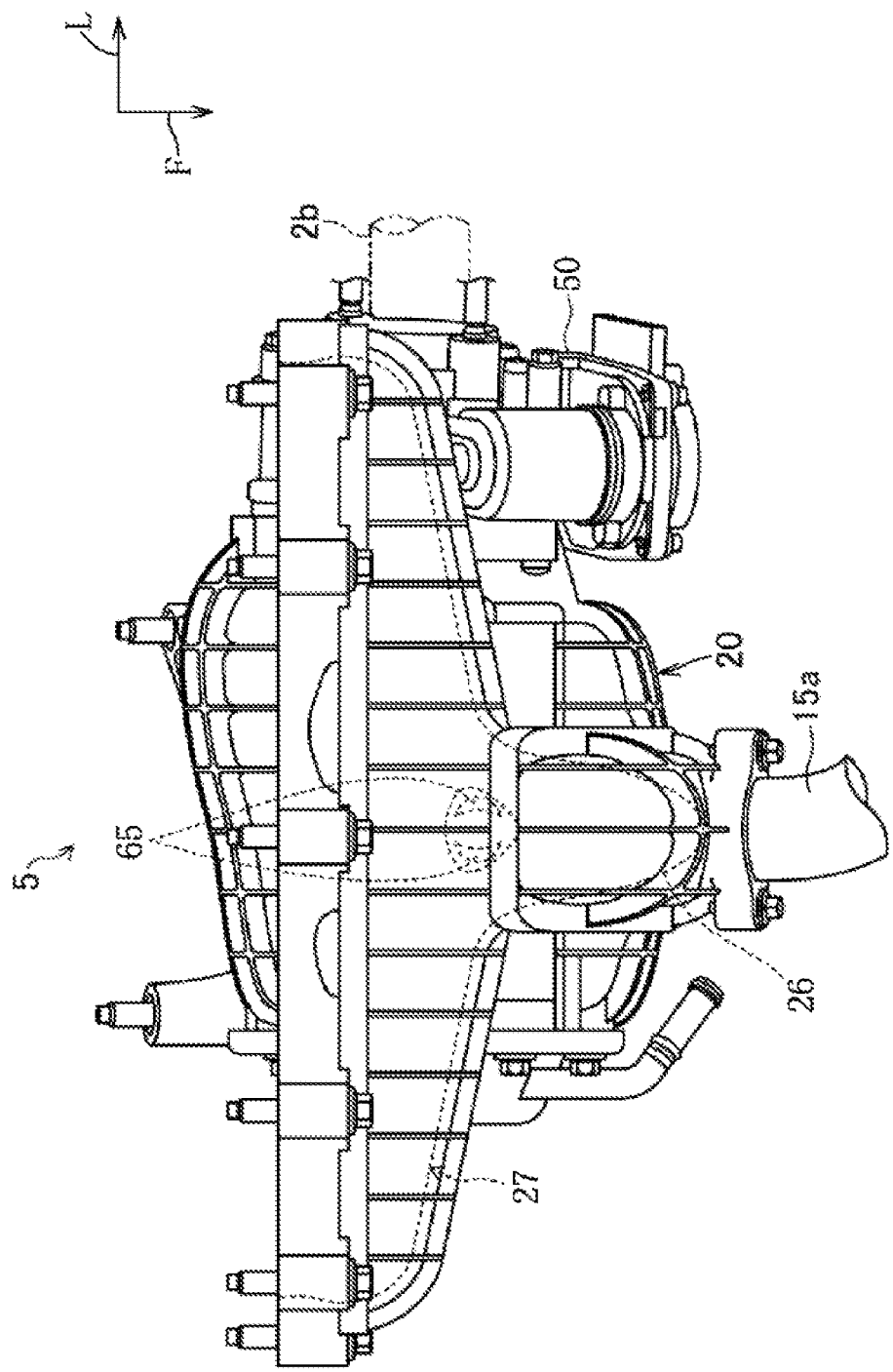
FIG. 3 is a schematic view illustrating the exterior of the intake system body seen from the top.
Figure 4:
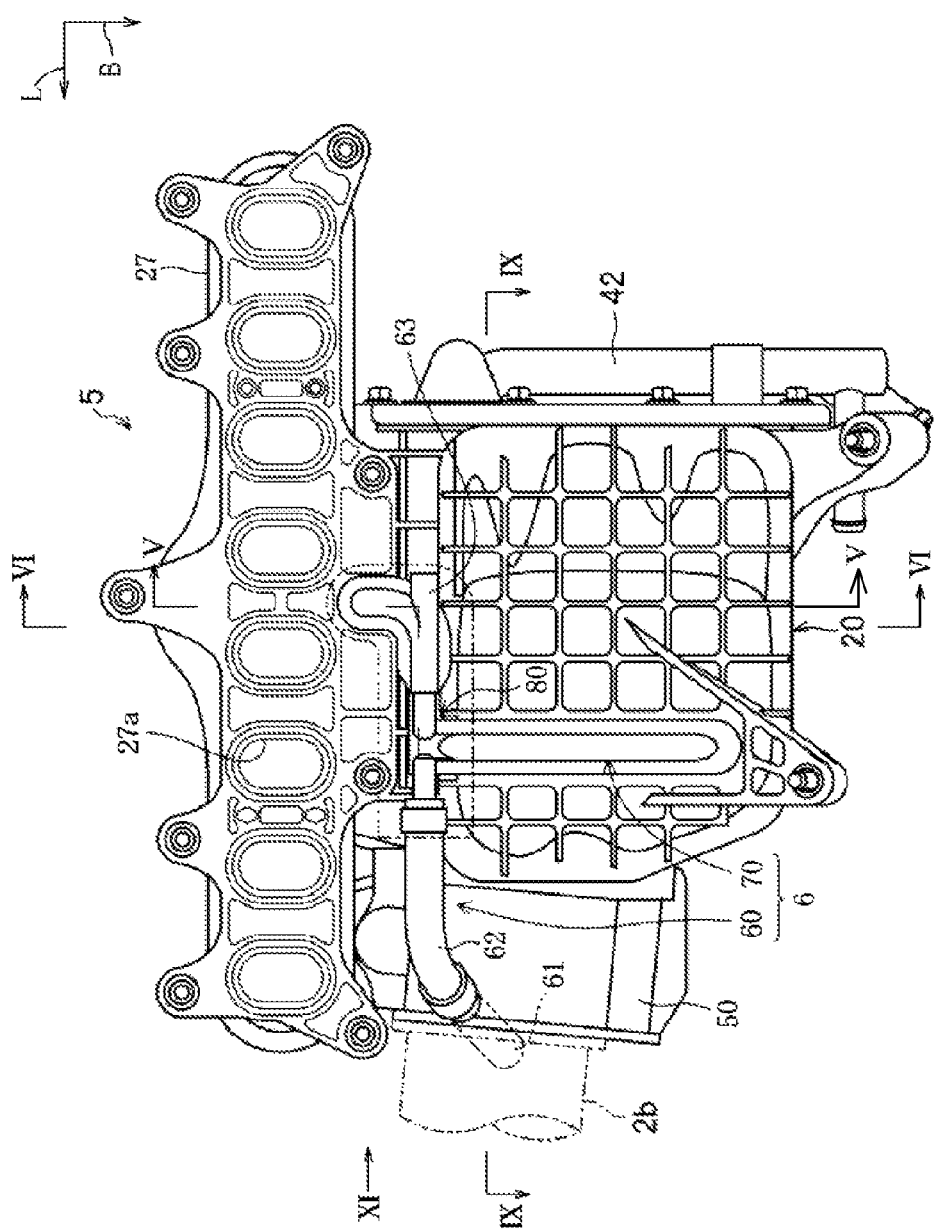
FIG. 4 is a schematic view illustrating the exterior of the intake system body seen from the rear.

As illustrated in FIGS. 2 to 6, the wide intake passage 27 is branched from an upper end section of the narrow intake passage 26 to extend in the left-and-right directions. As illustrated in FIG. 4, a plurality of port openings 27a corresponding to the intake ports 1b of the respective cylinders 1a are opened in the wide intake passage 27, and by attaching the intake system body 5 to the engine 1, the wide intake passage 27 communicates with the respective cylinders 1a through the port openings 27a. The downstream intake passage having a substantially T-shape is formed by the narrow and wide intake passages 26 and 27. As illustrated in FIGS. 5 and 6, the first gas introduction port 18 is formed in the narrow intake passage 26, and the high-pressure EGR gas is mixed with the intake air within the narrow intake passage 26.

Next, a suction mechanism 6 is described.

As illustrated in FIGS. 4 and 5, the suction mechanism 6 having a thin tubular shape is provided in the intake system body 5 to suck out the remaining liquid accumulated in the lower part of the chamber room 20. The suction mechanism 6 has a main passage 60 and a sub-passage 70. The main passage 60 bypasses the chamber room 20 and communicates with the intake passages respectively upstream and downstream of the chamber room 20. The sub-passage 70 communicates with the lower section of the downstream space 22b and the main passage 60.

The sub-passage 70 is formed by welding a resin-made tubular member to an outer face of the chamber room 20 on the rear side, and as illustrated in FIG. 5, it extends in the up-and-down directions along the outer face of the chamber room 20. A lower end of the sub-passage 70 communicates with the lower section of the downstream space 22b. The sub-passage 70 has a suction port 71 opening to the lower end section of the downstream space 22b and facing the lowest part of the bottom wall 20c. An upper end of the sub-passage 70 is connected with the main passage 60 at a communicating section 80 positioned at substantially the same height as an upper section of the internal space S.

The main passage 60 includes an air pipe 61 which is a resin molded component, a rubber hose 62, an aspirator 63 having a substantially T-shape, and an inner passage 64. An intermediate section of the main passage 60 is arranged to extend in the left-and-right directions at a height substantially the same as the upper section of the internal space S. The aspirator 63 is disposed in the straight section (the intermediate section of the main passage 60), and the aspirator 63 forms the communicating section 80 along the outer face of the chamber room 20 on the rear side.

Figure 10:
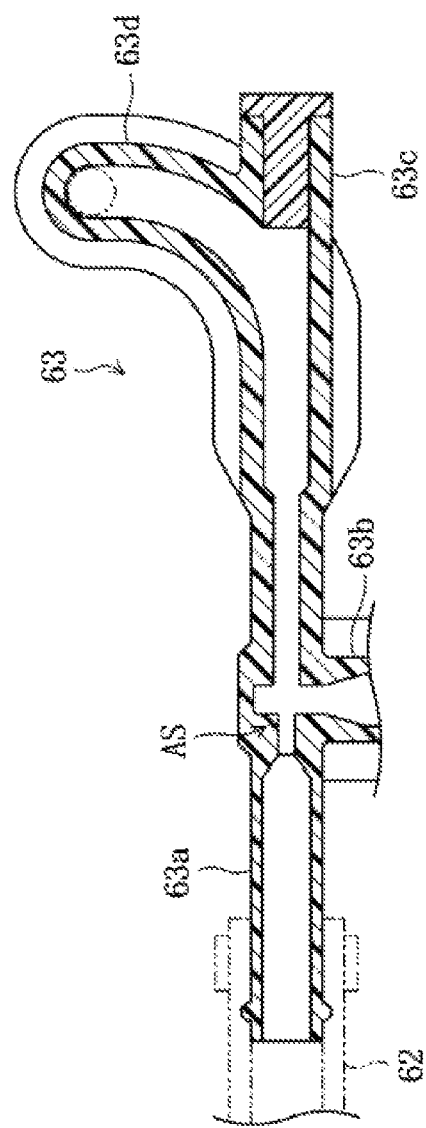
FIG. 10 is a schematic cross-sectional view illustrating an internal structure of a suction mechanism in a region indicated by a virtual line in FIG. 4.

The aspirator 63 is formed by using a resin-made tubular member, and is integrally formed with the chamber room 20 by being welded to the outer face of the chamber room 20 on the rear side. As illustrated in FIG. 10, the aspirator 63 has a main flow part 63a forming a tubular flow path extending substantially straight and a suction part 63b branched from an intermediate section of the main flow part 63a and forming a tubular flow path extending in a direction perpendicular to the main flow part 63a. The sub-passage 70 communicates to the main passage 60 through the suction part 63b.

A left end portion of the main flow part 63a is formed in a tubular shape opening at its tip, and is fixedly fastened by being inserted into the hose 62. A right end portion of the main flow part 63a is formed with a sealed portion 63c where an opening at the right end of the tubular flow path is sealed by a plug, and a curvy end portion 63d branched from the sealed portion 63c and curving upward.

As illustrated in FIG. 5, the inner passage 64 is formed to extend in a section of the intake system body 5 between the upper part of the chamber room 20 and the narrow intake passage 26. An upstream end of the inner passage 64 is connected with the curvy end portion 63d on the outer face of the chamber room 20. A downstream end of the inner passage 64 communicates with the narrow intake passage 26.

As illustrated in FIGS. 3, 5 and 6, two small liquid introducing ports 65 opposing to each other in the left-and-right directions are formed in a part of an inner wall face of a downstream section of the narrow intake passage 26, the part of the inner wall face being on the side of the chamber room 20 and bulging radially inward. The inner passage 64 communicates, on its downstream side, to the narrow intake passage 26 through the liquid introducing ports 65.

The first gas introduction port 18 for introducing the high-pressure EGR gas is formed in an upstream section of the narrow intake passage 26. In other words, the first gas introduction port 18 is positioned upstream than the downstream section communicating with the inner passage 64.

The merging section where the main passage 60 communicates with the sub-passage 70 has a T shape, and an aspirator structure AS narrowing the flow path (reducing the flow path cross-sectional area) is provided in the merging section to create a pressure-reduced state by the Venturi effect.

Therefore, when the intake air flows inside the main flow part 63a, an internal pressure of the merging section is reduced and a suction force (negative pressure) sucking through the sub-passage 70 from the suction port 71 positioned in the lower section of the downstream space 22b is generated. As a result, even when the remaining liquid (e.g., the condensed water) accumulates in the lower section of the downstream space 22b, the remaining liquid can effectively be sucked out to above the chamber room 20.

Moreover, the baffle plate 24 extends forward from the rear wall 20b of the chamber room 20 to near a rear end of the intercooler 40 while leaving the communication path 24a and covers, from above, the remaining liquid retained in the lower section of the downstream space 22b. For this reason, when the engine 1 is in the low engine load operation, the intake air introduced into the intake air inlet chamber 22 hardly affects the remaining liquid retained in the lower section of the downstream space 22b, and when the engine 1 is in the high engine load operation, in the intake air introduced into the intake air inlet chamber 22, only a part of the intake air reaching the downstream space 22b affects the remaining liquid. Therefore, the forward movement of the remaining liquid due to the flow of the intake air can be suppressed, and thus, the suction port 71 is inhibited from remaining opened, and the sucking-out function can be secured.

Next, the air pipe 61 is described.

Figure 11:
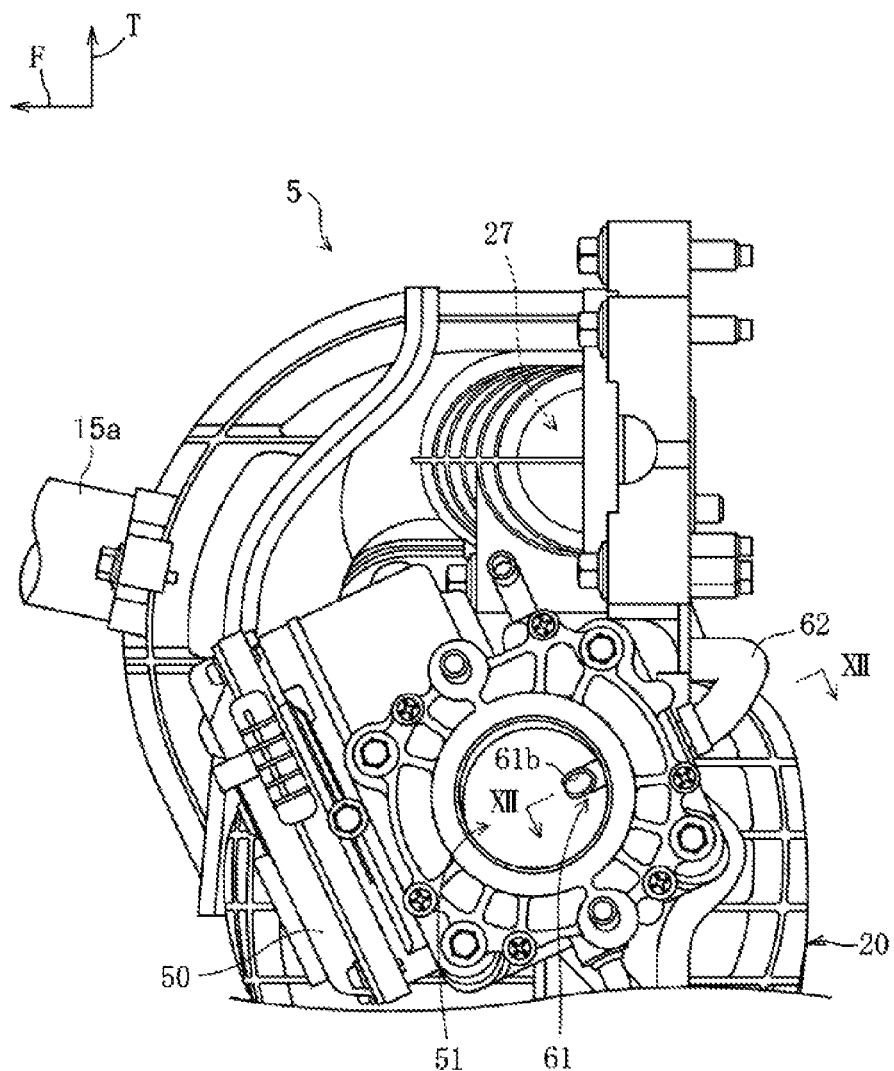
FIG. 11 is a schematic view of FIG. 4 seen from a direction indicated by the arrow XI on the left side in FIG. 4.
Figure 12:
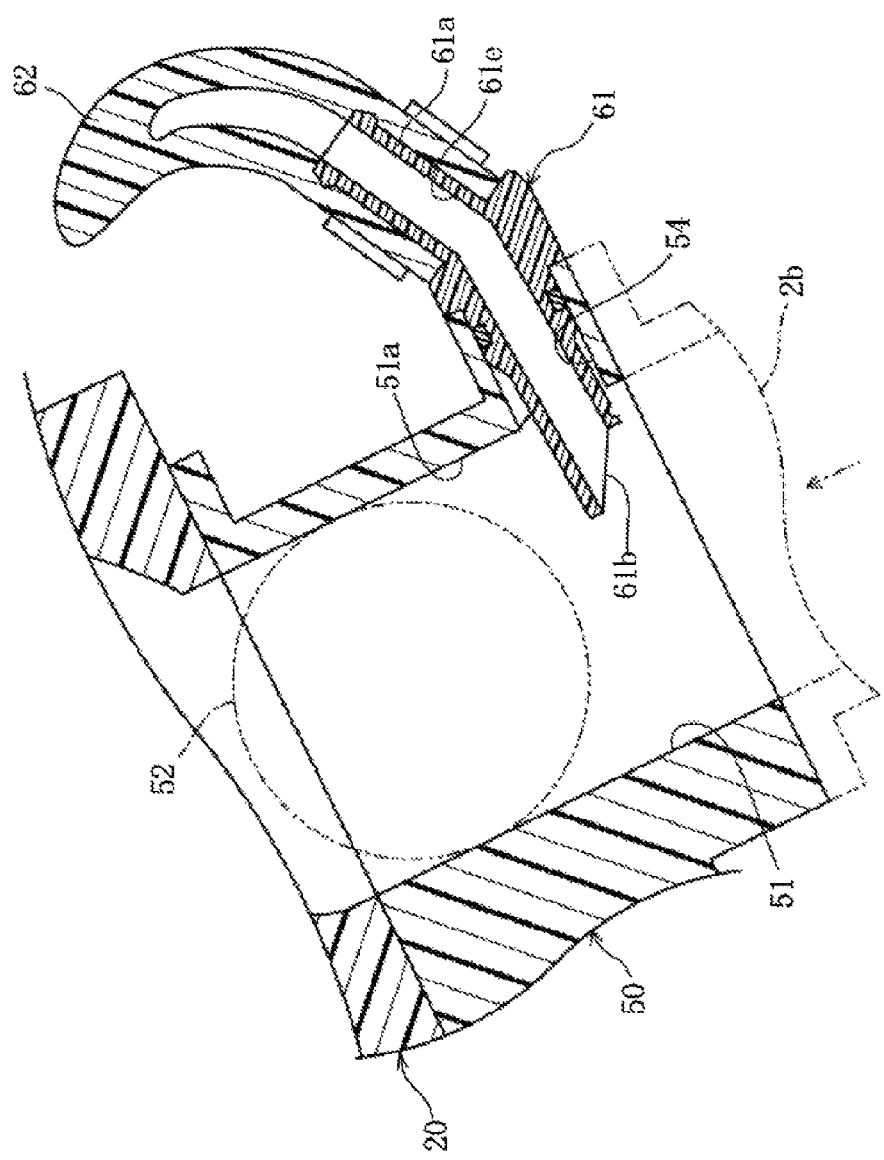
FIG. 12 is a cross-sectional view taken along a line XII-XII of FIG. 11.

As illustrated in FIGS. 4, 11 and 12, the air pipe 61 is attached to the valve unit 50, and an end of the hose 62 opposite to the side connected with the aspirator 63 is fixedly fastened to a cylindrical base end part 61a of the air pipe 61 projecting outside of the valve unit 50.

The valve unit 50 is formed with an insertion hole 54 communicating with coupling passage 51, and the air pipe 61 is inserted into the insertion hole 54 and fixed thereto in an airtight state. The part of the valve unit 50 to which the air pipe 61 is fixed is positioned upstream of the valve body 52.

An end part of the air pipe 61 projects toward the center of the coupling passage 51 from the inner wall face 51a of the coupling passage 51, and an opening 61b for introducing the intake air into the hose 62 through a tubular passage 61e is formed at a tip of the end part. Then, the opening 61b faces the upstream side of the coupling passage 51 and is disposed to be separated from the inner wall face 51a toward the center of the coupling passage 51.

Thus, the intake air can efficiently be taken into the opening 61b by a dynamic pressure and, even when oil flows along the inner wall face 51a of the coupling passage 51, the entrance of the oil into the opening 61b can effectively be suppressed.

Next, operation and effects of the intake system 2 of the engine 1 are described.

According to the intake system 2 of the engine 1 of this embodiment, by providing the baffle plate 24 dividing the upstream and downstream spaces 22a and 22b, the intake air inlet chamber 22 between the introducing portion 21 and the intercooler 40 can be formed as the intake passage where the upstream and downstream spaces 22a and 22b are consecutive in a single stream, and thus, the intake system 2 can flow the intake air introduced from the introducing portion 21 by the distance corresponding to the introducing amount, from the upstream space 22a to the downstream space 22b.

In the low engine load operation in which the intake air introducing amount is small, since the intake air mainly flows to the upstream space 22a and no further, the intake air flows to the intercooler 40 side only from the region where the intake air flows. In the high engine load operation in which the intake air introducing amount is large, since the intake air flows to the downstream space 22b through the upstream space 22a, the intake air flows to the intercooler 40 side from a larger region than in the low engine load operation. Thus, without requiring various interlocking mechanisms, particular arrangement adjustment or the like, the passage area where the intake air flows through to enter the intercooler 40 can be adjusted to a passage area corresponding to the engine load by utilizing the associated property between the intake air introducing amount and the flowing distance, and the flow speed of the intake air flowing through the intercooler 40 can be adjusted. Therefore, both suppressing generation of the condensed water in the low engine load operation and securing the engine output in the high engine load operation can be achieved, while achieving simplified structure of the intake system.

Since the baffle plate 24 divides the intake air inlet chamber 22 into the upper and lower sections (upstream and downstream spaces), a long intake flow path can be formed by the baffle plate 24 with the simple structure divided into the upper and lower sections, and the passage area of the intake air into the intercooler 40 can be adjusted to the passage area corresponding to the engine load with higher accuracy.

The communication path 24a communicating the intake-air flow downstream end section of the upstream space 22a to the intake-air flow upstream end section of the downstream space 22b is provided.

Thus, in the high engine load operation, the intake air can be shifted smoothly from the intake-air flow downstream end section of the upstream space 22a to the intake-air flow upstream end section of the downstream space 22b, and therefore, the passage area can be suitably adjusted according to the engine load with the simple structure.

The baffle plate 24 is integrally formed with the rear wall 20b of the chamber room 20. Thus, the baffle plate 24 and the intake air inlet chamber 22 can be formed in a single process, and the baffle plate 24 can be formed easily.

The introducing portion 21 is formed in the vertical wall 22w of the upstream space 22a, in parallel to the flow direction of the intake air flowing inside the intercooler 40. Thus, in the low engine load operation, since the flow passage through which the intake air flows can be shortened as much as possible, the responsiveness of the intake air supply to the operation of the valve body 52 can be improved.

The upstream space 22a is disposed on the upper side of the downstream space 22b. The suction mechanism 6 for sucking out the liquid drops retained in the downstream space 22b to the outside of the chamber room 20 is provided.

The baffle plate 24 covers, from above, the downstream space 22b while leaving the communication path 24a uncovered.

Thus, the exertion of the remaining liquid catching effect of the intake air can be prevented by the baffle plate 24, and as a result, the movement of the remaining liquid to separate from the suction port 71 of the suction mechanism 6 can be suppressed and, regardless of the engine load, the sucking-out function of the suction mechanism 6 can be secured.

Next, a modification of the intake system is described with reference to FIG. 13. Note that the main components similar to the embodiment described above (also referred to as the first embodiment) are illustrated, denoted with the same reference numerals as the first embodiment. The description of those components is omitted, and only components that are different are described.

In the intake system body 5, the example in which the single baffle plate 28 is provided in the narrow intake passage 26 is described; however, in an intake system body 5A of this modification, a second baffle plate 31 is provided in addition to the baffle plate 28.

Figure 13:
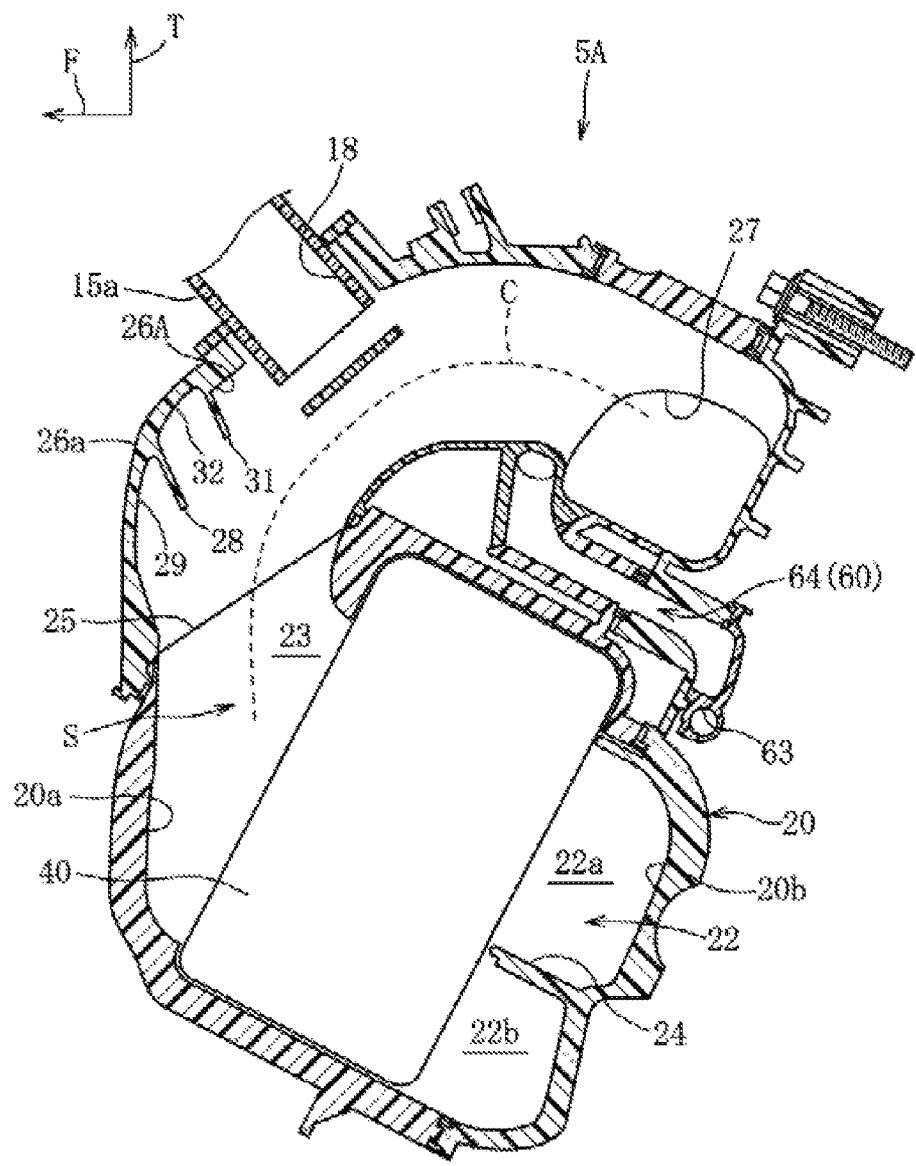
FIG. 13 is a view corresponding to FIG. 6 according to a modification of the present invention.

As illustrated in FIG. 13, the second baffle plate 31 is integrally provided to the inner wall of the convex section 26a facing the front end part of the intercooler 40.

The second baffle plate 31 has substantially the same structure as the baffle plate 28 and is provided near the baffle plate 28 on the downstream side. The second baffle plate 31 is formed to incline downward so as to be separated from the central axis C of a narrow intake passage 26A more on the downstream side in the flow direction of the intake air.

A second volume chamber 32 bulging radially outward with respect to the central axis C of the narrow intake passage 26A is formed between an end part of the second baffle plate 31 on an opposite side to the side of the central axis C and the end part of the baffle plate 28 on the opposite side to the side of the central axis C.

The baffle plate 28 captures, from the condensed water generated by the intercooler 40 and the remaining liquid retained in the lower part of the chamber room 20, the liquid drops caught by the intake air, and the second baffle plate 31 provided downstream of the baffle plate 28 in the flow direction captures liquid drops which cannot be captured by the baffle plate 28. Thus, the capturing amount can be increased. Particularly, it is effective in capturing the condensed water attached on an upper part of the intercooler 40.

Next, another modification of the intake system is described with reference to FIG. 14. In the intake system body 5, the example in which the single baffle plate 28 is provided in the narrow intake passage 26 is described; however, in an intake system body 5B of this modification, a second baffle plate 33 is provided in the intake air outlet chamber 23.

Figure 14:
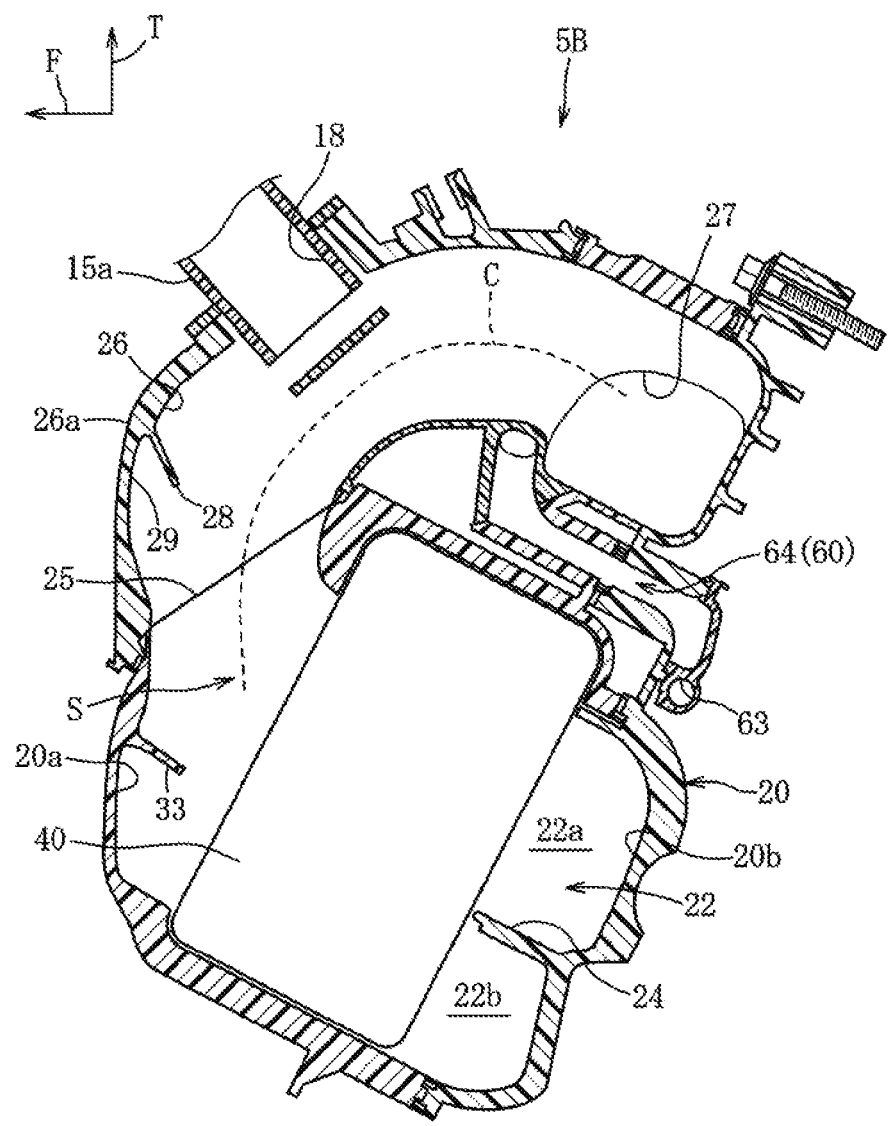
FIG. 14 is a view corresponding to FIG. 6 according to another modification of the present invention.

As illustrated in FIG. 14, a third baffle plate 33 is integrally provided to a front wall 20a of the chamber room 20 facing the front end part of the intercooler 40. The third baffle plate 33 is formed continuously from a left end of the front wall 20a of the chamber room 20 to a right end of the front wall 20a, and extends rearward from the front wall 20a of the chamber room 20 toward a front end of the intercooler 40.

The third baffle plate 33 captures, from the condensed water generated by the intercooler 40 and the remaining liquid retained in the lower part of the chamber room 20, the liquid drops caught by the intake air, and the baffle plate 28 provided downstream of the third baffle plate 33 in the flow direction captures liquid drops which cannot be captured by the third baffle plate 33. Thus, the capturing amount can be increased. Particularly, it is effective in capturing the remaining liquid retained in the lower part of the chamber room 20.

Next, modifications obtained by partially changing the embodiment are described.

In the first embodiment, the example in which the chamber room 20 is the resin molded component formed by coupling the five parts is described; however, the number of the parts is not limited to five, and it may be any number depending on the assembling procedure and specification, and the number of the parts may be reduced by omitting the transverse passage or the like.

In the first embodiment, the example in which the engine is the inline four-cylinder diesel engine is described; however, the type of the engine is not limited to this, and it may be a reciprocating engine, and the number of the cylinders and their layout and the like are not particularly limited.

The present invention can be implemented in various forms through applying various changes to the embodiment without deviating from the spirit and scope of the present invention by a person having ordinary skill in the art, and the present invention includes such modified embodiments.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine
2 Intake System
6 Suction Mechanism
20 Chamber Room
20b Rear Wall
22 Intake Air Inlet Chamber
22a Upstream Space
22b Downstream Space
22w Vertical Wall
24 Baffle Plate
24a Communication Path
40 Intercooler
S Internal Space

What is claimed is:

1. An intake system for an engine configured to operate in a low load operation in which an intake air introducing amount is small and in a high load operation in which an intake air introducing amount is large, comprising:
  a chamber room formed in an intermediate section of an intake passage;
  an intercooler disposed inside the chamber room;
  an intake air inlet chamber formed in a part of the chamber room upstream of the intercooler;
  an introducing portion for introducing intake air into the intake air inlet chamber; and
  a baffle plate extending from a rear wall of the chamber room to near a rear end of the intercooler and dividing the intake air inlet chamber into an upstream space communicating with the introducing portion and a downstream space communicating with the introducing portion via the upstream space;
    wherein when the engine is in the low engine load operation and the intake air introducing amount is small, the baffle plate drives the intake air to mainly flow through the upstream space to an intercooler side, and when the engine is in the high engine load operation and the intake air introducing amount is large, the baffle plate drives the intake air to flow through the upstream and downstream spaces to the intercooler side.

2. The system of claim 1, wherein the baffle plate divides the intake air inlet chamber into an upper section and a lower section.

3. The system of claim 1, wherein the baffle plate is integrally formed with a wall of the chamber room.

4. An intake system for an engine configured to operate in a low load operation in which an intake air introducing amount is small and in a high load operation in which an intake air introducing amount is large, comprising:
- a chamber room formed in an intermediate section of an intake passage;
- an intercooler disposed inside the chamber room;
- an intake air inlet chamber formed in a part of the chamber room upstream of the intercooler;
- an introducing portion for introducing intake air into the intake air inlet chamber; and
- a baffle plate extending from a rear wall of the chamber room to near a rear end of the intercooler and dividing the intake air inlet chamber into an upstream space communicating with the introducing portion and a downstream space communicating with the introducing portion via the upstream space;
- wherein when the engine is in the low engine load operation and the intake air introducing amount is small, the baffle plate drives the intake air to mainly flow through the upstream space to an intercooler side, and when the engine is in the high engine load operation and the intake air introducing amount is large, the baffle plate drives the intake air to flow through the upstream and downstream spaces to the intercooler side; and
- wherein the introducing portion is formed in a vertical wall of the upstream space, the vertical wall being in parallel to the flow direction of the intake air flowing inside the intercooler.

5. An intake system for an engine configured to operate in a low load operation in which an intake air introducing amount is small and in a high load operation in which an intake air introducing amount is large, comprising:
- a chamber room formed in an intermediate section of an intake passage;
- an intercooler disposed inside the chamber room;
- an intake air inlet chamber formed in a part of the chamber room upstream of the intercooler;
- an introducing portion for introducing intake air into the intake air inlet chamber; and
- a baffle plate extending from a rear wall of the chamber room to near a rear end of the intercooler and dividing the intake air inlet chamber into an upstream space communicating with the introducing portion and a downstream space communicating with the introducing portion via the upstream space;
- wherein when the engine is in the low engine load operation and the intake air introducing amount is small, the baffle plate drives the intake air to mainly flow through the upstream space to an intercooler side, and when the engine is in the high engine load operation and the intake air introducing amount is large, the baffle plate drives the intake air to flow through the upstream and downstream spaces to the intercooler side; and
- wherein a communication path is provided to communicate, in a flow direction of the intake air, a downstream end section of the upstream space with an upstream end section of the downstream space.

6. The system of claim 5, wherein the upstream space is disposed on an upper side of the downstream space;
- wherein the system further comprises a suction mechanism tube for sucking out liquid drops retained in the downstream space, to outside of the chamber room; and
- wherein the baffle plate covers, from above, the downstream space while leaving the communication path uncovered.

7. An intake system for an engine, comprising:
- a chamber room formed in an intermediate section of an intake passage;
- an intercooler disposed inside the chamber room;
- an intake air inlet chamber formed in a part of the chamber room upstream of the intercooler;
- a suction tube for sucking out liquid drops retained in the intake air inlet chamber, to the outside of the chamber room; and
- a baffle plate covering the liquid drops from above to limit influence of the intake air on the liquid drops retained in the intake air inlet chamber, the influence depending on a flow speed of the intake air.

8. The system of claim 7, wherein the baffle plate divides the intake air inlet chamber into an upper section and a lower section.

9. The system of claim 7, wherein the baffle plate is integrally formed with a wall of the chamber room.

10. The system of claim 7, wherein a suction port of the suction tube is formed to face a lowest part of a bottom wall of the chamber room.

11. The system of claim 7, further comprising an introducing portion for introducing the intake air into the intake air inlet chamber;
- wherein the baffle plate divides the intake air inlet chamber into an upstream space communicating with the introducing portion and a downstream space communicating to the introducing portion via the upstream space; and
- wherein when the engine is in a low engine load operation, the intake air mainly flows through the upstream space to an intercooler side via the baffle plate, and when the engine is in a high engine load operation, the intake air flows through the upstream and downstream spaces to the intercooler side via the baffle plate.

* * * * *